United States Patent
Masuno et al.

(10) Patent No.: US 8,457,485 B2
(45) Date of Patent: Jun. 4, 2013

(54) OPTICAL ELEMENT HOLDER AND STEREOSCOPIC IMAGING DEVICE UTILIZING THE HOLDER

(75) Inventors: Takashi Masuno, Osaka (JP); Tatsuro Juri, Osaka (JP); Kenjiro Tsuda, Kyoto (JP); Hiroaki Shimazaki, Osaka (JP); Yuji Nagaishi, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/338,274

(22) Filed: Dec. 28, 2011

(65) Prior Publication Data

US 2012/0163789 A1    Jun. 28, 2012

(30) Foreign Application Priority Data

Dec. 28, 2010 (JP) ................. 2010-294049

(51) Int. Cl.
*G03B 35/00* (2006.01)
*G02B 27/22* (2006.01)

(52) U.S. Cl.
USPC ............. 396/327; 359/462; 359/477

(58) Field of Classification Search
USPC .......... 396/322, 324, 325, 327, 334; 359/462, 359/477; 348/42
See application file for complete search history.

(56) References Cited

U.S. PATENT DOCUMENTS

| 2,916,962 | A | * | 12/1959 | Spottiswoode et al. ...... 396/325 |
| 4,411,500 | A | | 10/1983 | Yonezawa et al. |
| 5,822,115 | A | | 10/1998 | Umeda et al. |
| 7,410,463 | B2 | | 8/2008 | Kanai |

FOREIGN PATENT DOCUMENTS

| JP | H04-240801 A | 8/1992 |
| JP | H05-232405 A | 9/1993 |
| JP | H11-088733 A | 3/1999 |
| JP | 2004-312545 A | 11/2004 |
| JP | 2005-198800 A | 7/2005 |

* cited by examiner

*Primary Examiner* — WB Perkey
*Assistant Examiner* — Minh Phan
(74) *Attorney, Agent, or Firm* — Judge Patent Associates (57) ABSTRACT

Afforded is an optical element holder allowing high-accuracy stereo images to be taken. The holder includes: a rectangular parallelepiped beam splitter (5) having a rectangular incident surface (12); a pair of mutually opposing holding members (8) into which end portions of the beam splitter along the x-axis are fitted; and a base portion (9) and screws (10) that press on the holding members (8), drawing them toward each other. Each of the holding members (8) has a flat surface portion covering a lateral surface of the beam splitter (5), and a peripheral wall portion standing along the periphery of the flat surface potion. A width, along the x-axis, whereby the peripheral wall portion and a first light-exit surface opposing the incident surface (12) of the beam splitter (5) overlap is greater than a width, in the same orientation, whereby the incident surface (12) and the peripheral wall portion overlap.

7 Claims, 11 Drawing Sheets

OPTICAL ELEMENT HOLDER AND STEREOSCOPIC IMAGING DEVICE UTILIZING THE HOLDER

CROSS REFERENCE TO RELATED APPLICATION

The disclosures of Japanese Patent Application No. 2010-294049, filed on Dec. 28, 2010 and Japanese Patent Application No. 2011-257980, filed on Nov. 25, 2011 are incorporated herein by reference.

BACKGROUND OF THE INVENTION

1. Field of the Invention

The present invention relates to an optical element holder used to take stereo images with two cameras, and to a stereoscopic imaging device utilizing the holder.

2. Description of the Background Art

Figure 11:
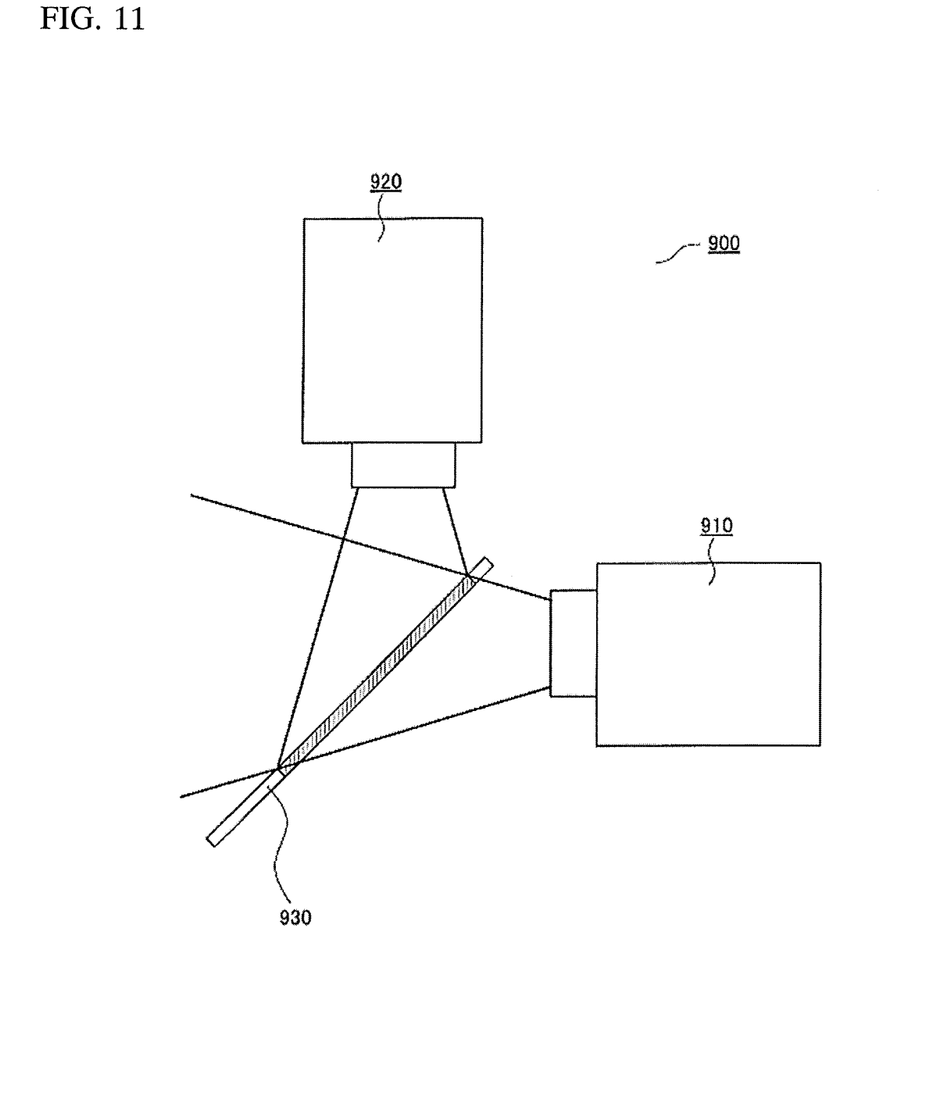
FIG. 11 is a side view of a conventional stereoscopic imaging device.

In order photograph stereo images, to date a stereoscopic imaging device 900 as shown in FIG. 11 has at times been used. The stereoscopic imaging device 900 includes a left-eye camera 910, a right-eye camera 920, and a platelike semi-reflective mirror 930. The semi-reflective mirror 930 passes one portion of light incident on the mirror and reflects the remaining portion. The left-eye camera 910 shoots the optical image having passed through the semi-reflective mirror 930, and the right-eye camera 920 shoots the optical image having been reflected by the semi-reflective mirror 930. Furthermore, the left-eye camera 910 can move in the direction perpendicular to the drawing sheet. The stereo base between the left-eye camera 910 and the right-eye camera 920 is thereby changed to adjust the left-eye and right-eye parallaxes.

Because the semi-reflective mirror 930 described above is platelike in form, if the semi-reflective mirror 930 is of large size, it will deflect under its own weight. This causes distortion of the optical image and displacement along the way of the optical path to occur in light having passed through or been reflected by the semi-reflective mirror 930. A consequent problem is that taking highly accurate stereo images is made difficult. It is to be noted that Japanese Laid-open Patent Publication No. 2004-312545 discloses technology relevant to the present application.

SUMMARY OF THE INVENTION

Therefore, an object of the present invention is to make available an optical element holder, and a stereoscopic imaging device using the holder, that allows stereo images of high accuracy to be taken.

The present invention relates to an optical element holder configured to be used to take a stereo image by use of two cameras. The optical element holder includes: a rectangular parallelepiped beam splitter that includes a rectangular incident surface and an opposing surface facing the rectangular incident surface; a pair of holding members that are arranged so as to face each other and that are configured to hold the beam splitter in a state where end portions, in a longitudinal direction, of the beam splitter are fitted in the pair of holding members; and a pressing member configured to press the pair of holding members in a direction in which the pair of holding members approach each other. Each of the pair of holding members includes a flat surface portion that covers a side surface of the beam splitter, and a peripheral wall portion extending from a periphery of the flat surface portion. An overlapping width between the opposing surface and the peripheral wall portion in the longitudinal direction of the beam splitter is greater than an overlapping width between the incident surface and the peripheral wall portion in the same direction.

When the optical element holder of the present invention is used, it is possible to prevent distortion of an optical image and displacement of an optical path direction, and to take a stereo image of high accuracy.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
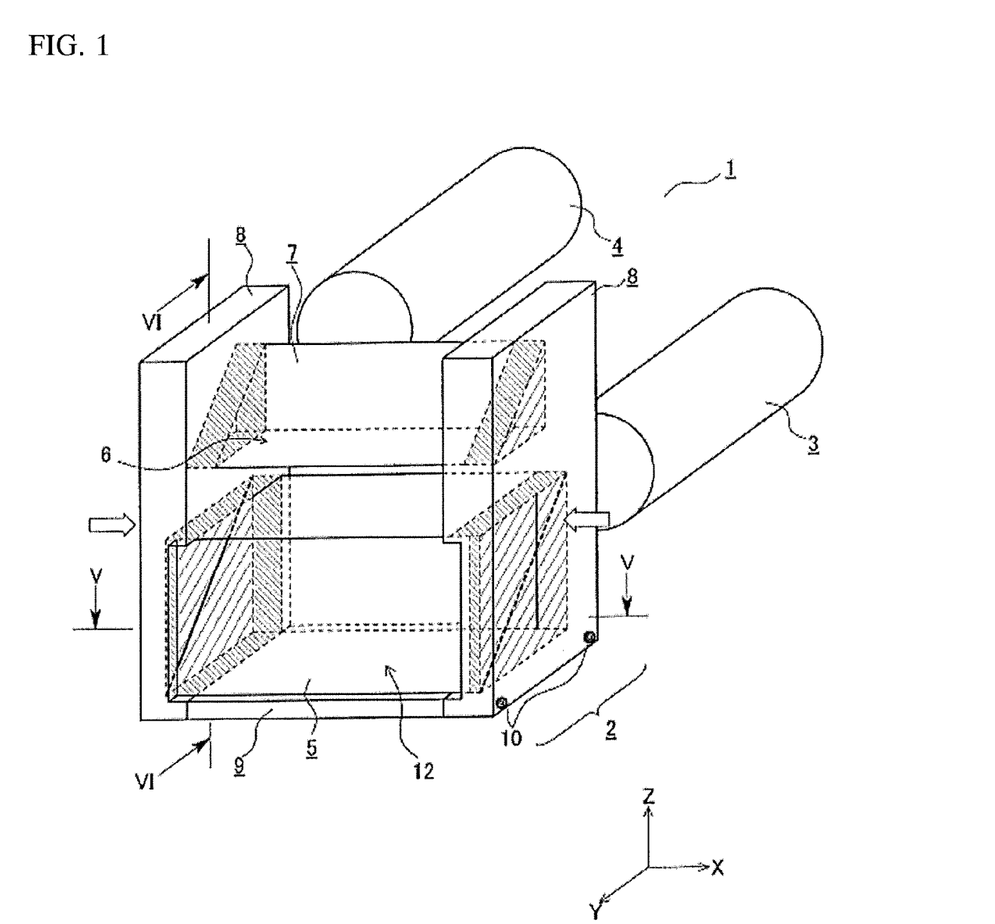
FIG. 1 is a perspective view of a stereoscopic imaging device according to a first embodiment of the present invention.
Figure 2:
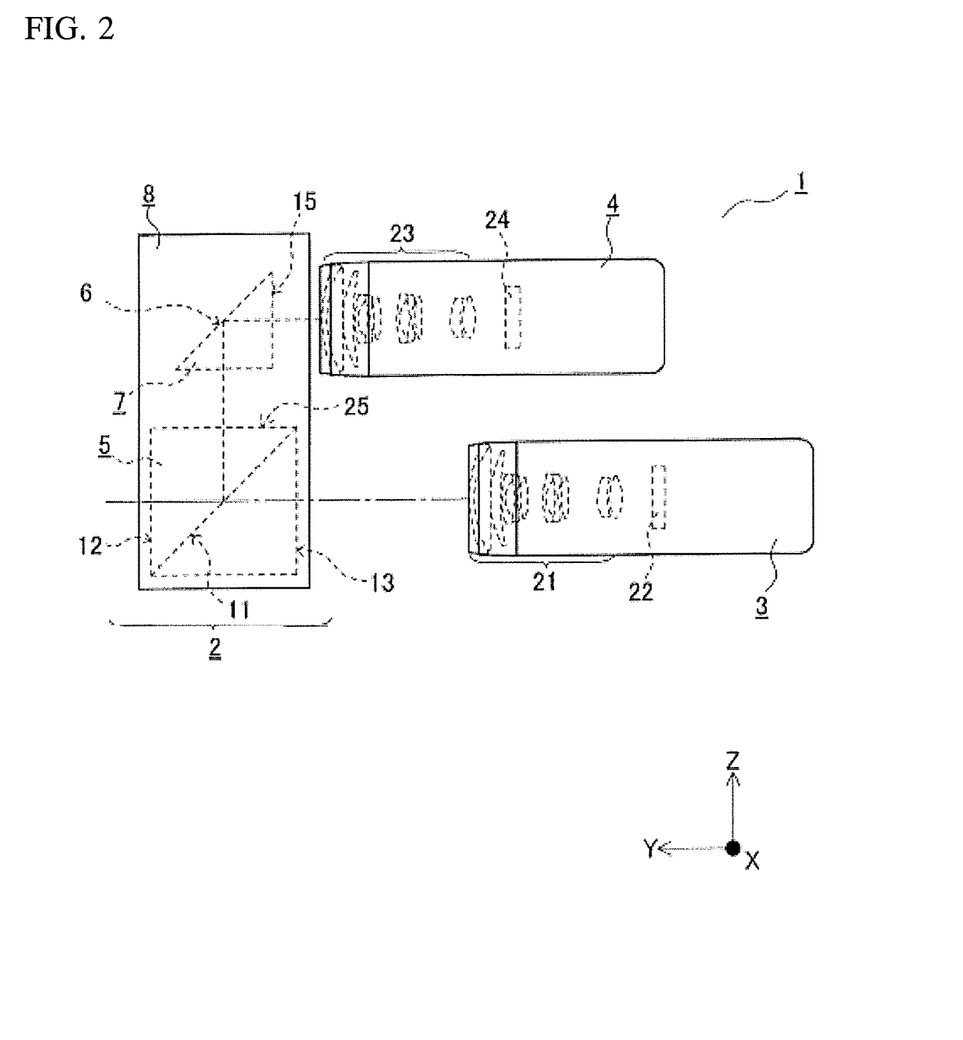
FIG. 2 is a side view of the stereoscopic imaging device shown in FIG. 1.
Figure 3:
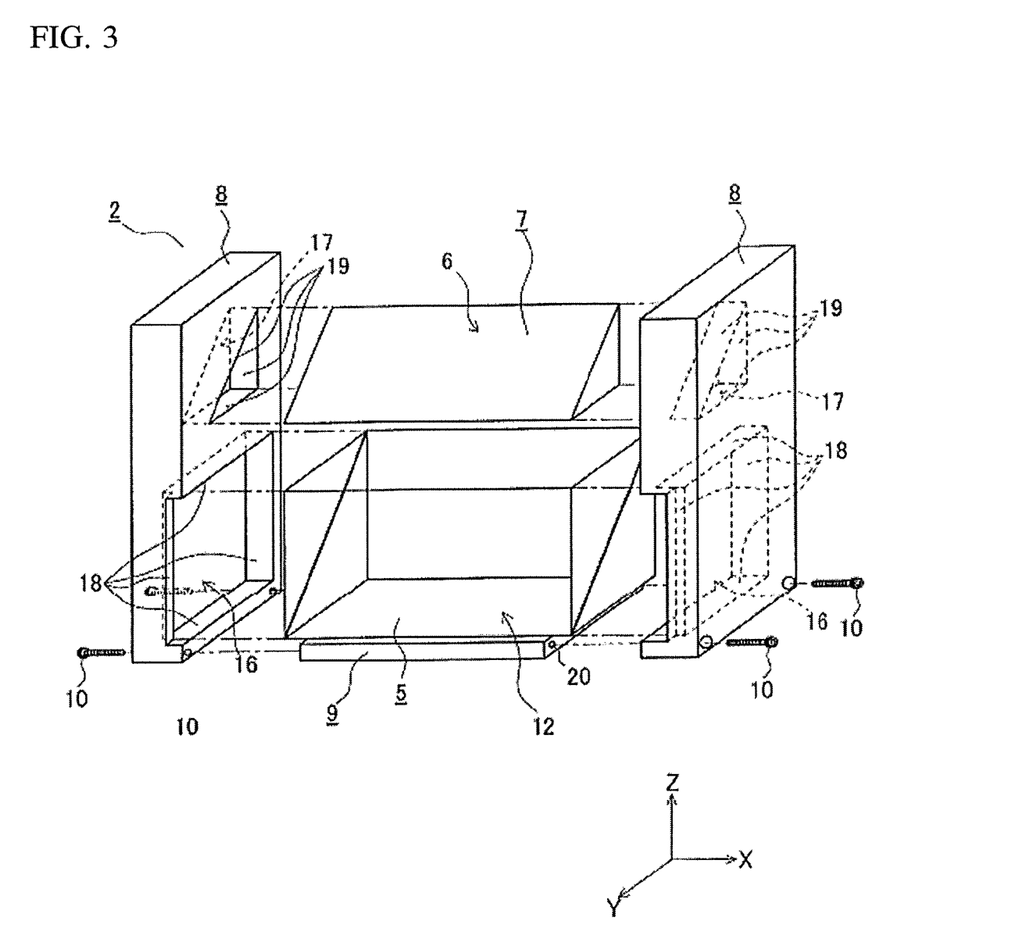
FIG. 3 is an exploded perspective view of an optical element holder shown in FIG. 1.

FIG. 1 is a perspective view of a stereoscopic imaging device according to a first embodiment of the present invention, FIG. 2 is a side view of the stereoscopic imaging device shown in FIG. 1, and FIG. 3 is an exploded perspective view of an optical element holder shown in FIG. 1. Hereinafter, the direction in which a long side of an incident surface of a beam splitter extends is defined as an X-axis direction, and the direction in which a short side thereof extends is defined as a Z-axis direction.

A stereoscopic imaging device 1 is configured to take a stereoscopic image, and includes an optical element holder 2, a first camera 3 which takes an optical image for a left eye, and a second camera 4 which takes an optical image for a right eye. Each of the first camera 3 and the second camera 4 is arranged such that the optical axis of its optical system is parallel to the Y-axis (that is, perpendicular to an incident surface 12).

The optical element holder 2 includes: a beam splitter 5 which splits light into two directions; a right-angled prism 7 which further reflects the light bent by the beam splitter 5 and leads the reflected optical image to the second camera 4; a pair of holding members 8 which holds the beam splitter 5 and the right-angled prism 7; and a base member 9 and screws 10 which press the holding members 8 in directions in which the holding members 8 approach each other (directions indicated by white arrows in FIG. 1).

Figure 4A:
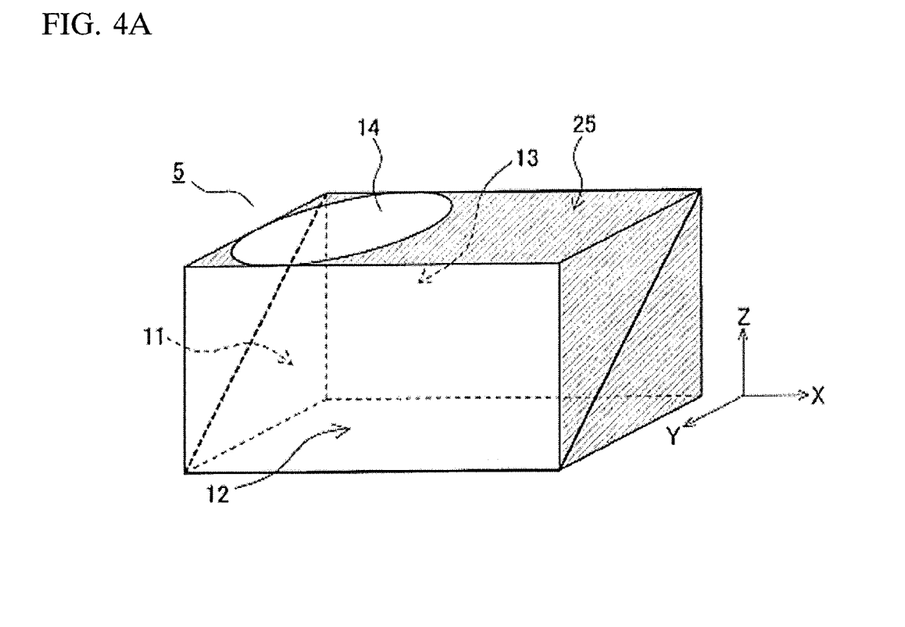
FIG. 4A is a perspective view of a beam splitter viewed from an incident surface thereof.
Figure 4B:
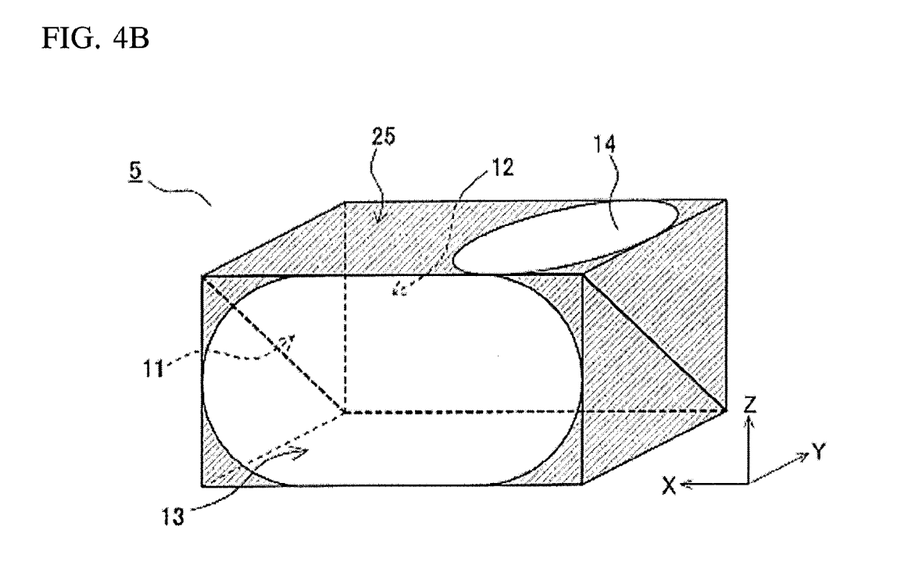
FIG. 4B is a perspective view of the beam splitter viewed from a light exit surface thereof.

FIG. 4A is a perspective view of the beam splitter viewed from the incident surface thereof, and FIG. 4B is a perspective view of the beam splitter viewed from a first light exit surface.

The beam splitter 5 is a rectangular parallelepiped prism beam splitter. The beam splitter 5 includes: an optically functional surface 11 provided therein; the rectangular incident surface 12 on which light is incident; a first light exit surface 13 which faces the incident surface 12 and from which the light having passed the optically functional surface 11 is emitted; and a second light exit surface 25 which is a top surface of the beam splitter 5 and from which the light bent by the optically functional surface 11 is emitted. The optically functional surface 11 is a semi-reflective mirror, allows a part of the incident light from the incident surface 12 to pass therethrough, and reflects the other part of the incident light in the Z-axis positive direction. Further, the optically functional surface 11 is provided within the beam splitter 5 so as to have an exact angle of 45 degrees relative to the incident surface 12. The whole of the incident surface 12 is transparent so as to allow light to pass through the entire surface thereof. The hatched areas in the four corners of the first light exit surface 13 shown in FIG. 4B are shaded so as to block unnecessary light that will not pass through the optical system of the first camera 3. The second light exit surface 25 is provided with a reflected-light-path transparent portion 14 having a circular shape that allows a light beam that will advance within a view angle of the optical system of the second camera to pass therethrough. The entire portion of the second light exit surface 25 excluding the reflected-light-path transparent portion 14 (hatched area) is shaded. In this manner, by shading the surfaces of the beam splitter 5 other than the areas from which the light whose image is to be taken exit, it is possible to suppress unnecessary light to enter the beam splitter 5.

It should be noted that the beam splitter 5 is prepared by putting together inclined surfaces of right-angled prisms whose cross sections parallel to the YZ plane are right-angled isosceles triangles. Since the surfaces of the right-angled prisms are precisely figured by being polished, after they are put together, a rectangular parallelepiped prism beam splitter is formed in which adjacent side surfaces are exactly perpendicular with one other. In addition, metal vapor deposition surfaces are formed on the inclined surfaces of the right-angled prisms, respectively. These metal vapor deposition surfaces function as an optically functional surface.

With reference back to FIGS. 1 to 3, the right-angled prism 7 includes a reflecting surface 6 which reflects a part of the light reflected by the beam splitter 5, and a light exit surface 15 that is parallel to the XZ plane. The right-angled prism 7 is supported above the beam splitter 5, in a state where the inclined surface being the reflecting surface 6 is oriented diagonally upward and the light exit surface 15 is oriented in the Y-axis negative direction. Then, a part of the light reflected by the optically functional surface 11 is bent in the Y-axis negative direction by the reflecting surface 6 and then emitted from the light exit surface 15.

Next, with reference to FIGS. 1 to 3 again, the holding members 8, the base member 9, and the screws 10 will be described.

The pair of holding members 8 is arranged so as to face each other and is configured to hold end portions (hatched portions in FIG. 1), in the X-axis direction, of the beam splitter 5 and of the right-angled prism 7. The pair of holding members 8 are formed so as be in mirror symmetry with each other, and prepared by machining, for example, a resin plate. As shown in FIG. 3, recesses are formed in each of the pair of holding members 8. The end portions of the beam splitter 5 and the end portions of the right-angled prism 7 are fitted in the recesses. Specifically, each of the holding members 8 includes flat surface portions 16 and 17 which cover a side surface of the beam splitter 5 and a side surface of the right-angled prism 7, respectively, and peripheral wall portions 18 and 19 which extend from peripheries of the flat surface portions 16 and 17, respectively. The overlapping width between the beam splitter 5 and the peripheral wall portion 18 will be described later.

The base member 9 is a plate material that supports the bottom surface of the beam splitter 5. Each of the end surfaces of the base member 9 in the X-axis direction is provided with threaded holes 20 for screwing a corresponding holding member 8 to the base member 9.

The screws 10 are screwed into the respective threaded holes 20, through the holding members 8 and press the pair of holding members 8 in directions in which the holding members 8 approach each other. In the present embodiment, the base member 9 and the screws 10 form a pressing member. When the holding members 8 and the base member 9 are screwed together with the screws 10, the holding members 8 are fixed to the base member 9, in a state where the beam splitter 5 and the right-angled prism 7 are interposed between the holding members 8, being pressed in the directions indicated by the white arrows shown in FIG. 1. Therefore, no force is applied to the beam splitter 5 in the direction parallel to its side surfaces (direction parallel to the YZ plane in FIGS. 1 to 3). As a result, it is possible to prevent the optically functional surface 11 of the beam splitter 5 from peeling off or being damaged.

The first camera 3 includes an optical system 21 which forms an optical image, and an image sensor 22 which converts the optical image formed by the optical system 21 into an electric signal. The first camera 3 is arranged in a state where the optical axis of the optical system 21 coincides with the Y-axis direction and the optical system 21 faces the first light exit surface 13. The first camera 3 is supported, movably in the X-axis direction, by a support mechanism not shown. Accordingly, it is possible to change the stereo base in the X-axis direction between the first camera 3 and the second camera 4, and to adjust the parallax amount for the left eye and the right eye.

Similarly to the first camera 3, the second camera 4 includes an optical system 23 and an image sensor 24. The second camera 4 captures the optical image bent by the optically functional surface 11 and the reflecting surface 6. Here, the second camera 4 is arranged in a state where the optical axis of the optical system 23 coincides with the Y-axis direction and the optical system 23 faces the light exit surface 15. It should be noted that, instead of moving the first camera 3, the first camera 3 may be fixed and only the second camera 4 may be moved in the X-axis direction. Alternatively, both of the first camera 3 and the second camera 4 may be configured to be movable in the X-axis direction. The first camera 3 is supported at a position shifted in the Y-axis negative direction from the second camera 4 such that the length of the optical path on the optical axis of the first camera 3 (indicated by chain line) is equal to the length of the optical path on the optical axis of the second camera (indicated by broken line).

Next, with reference to FIGS. 5 and 6, the overlapping width between the beam splitter 5 and the peripheral wall portion 18 of the holding members 8 will be described.

Figure 5:
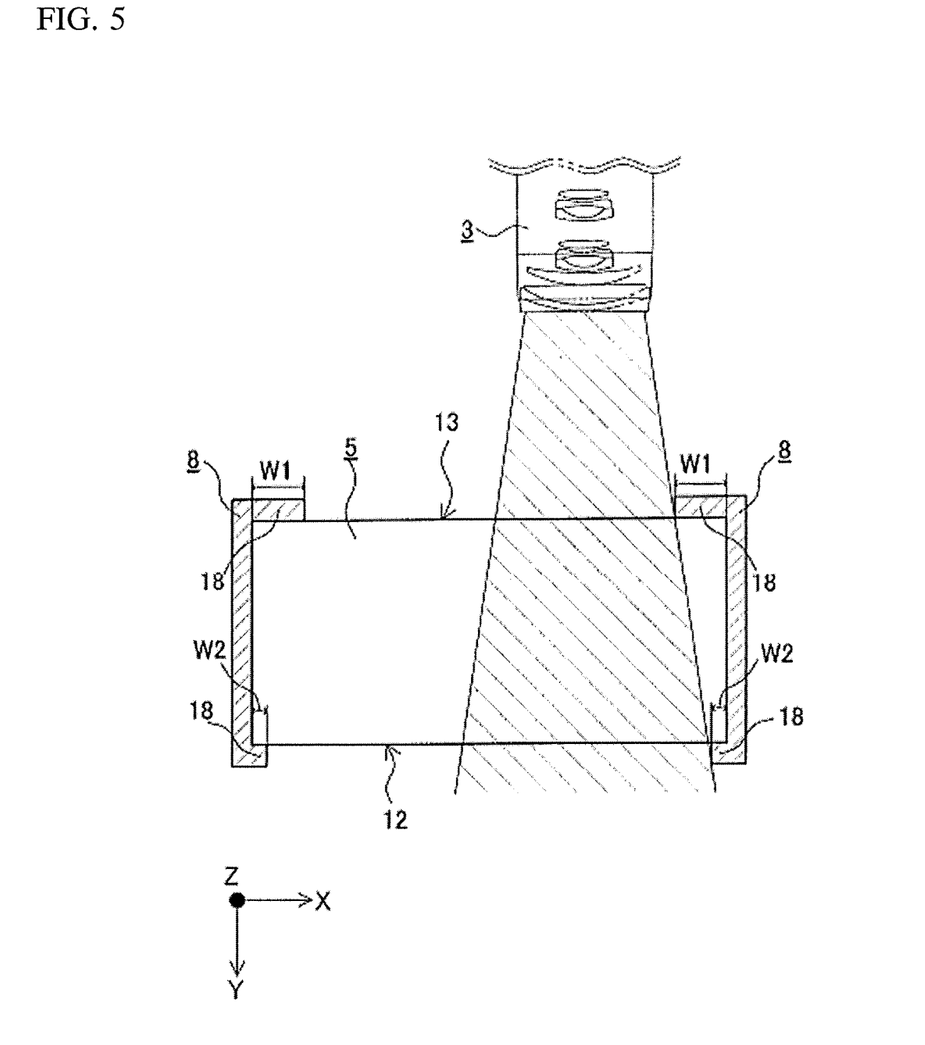
FIG. 5 is a cross-sectional view of the stereoscopic imaging device shown in FIG. 1, viewed along a V-V line.

FIG. 5 is a cross-sectional view of the stereoscopic imaging device shown in FIG. 1, viewed along the V-V line. FIG. 6 is a cross-sectional view of the stereoscopic imaging device shown in FIG. 1, viewed along the VI-VI line.

An overlapping width W1 in the X-axis direction between the first light exit surface 13 of the beam splitter 5 and the peripheral wall portion 18 and an overlapping width W2 in the X-axis direction, between the incident surface 12 of the beam splitter 5 and the peripheral wall portion 18 are designed in accordance with the view angle of the optical system 21 of the first camera 3. Specifically, as shown in FIG. 5, each of the overlapping widths W1 and W2 is designed such that: when the first camera 3 is located at a position nearest to a corresponding end portion of the beam splitter 5, the width in the X-axis direction of the peripheral wall portion 18 becomes the maximum within an range where the light beam (indicated by right down hatching) advancing within the view angle of the optical system 21 of the first camera 3 is not blocked by the peripheral wall portion 18. Therefore, in the present embodiment, the overlapping width W1 is formed greater than the overlapping width W2. It should be noted that FIG. 5 shows a state where the stereo base between the first camera 3 and the second camera 4 is at the maximum. The overlapping widths W1 and W2 on the left side in FIG. 5 are also designed in a similar manner. That is, the overlapping widths W1 and W2 on the left side in FIG. 5 are designed such that they become the maximum in an range where the light beam advancing within the view angle of the optical system 21 of the first camera 3 is not blocked by the peripheral wall portion 18 in a state where the stereo base between the first camera 3 and the second camera 4 is at the minimum.

In order to suppress a positional displacement before and behind the beam splitter 5, it is necessary to hold the beam splitter 5 in a state where the holding members 8 overlap portions of the incident surface 12 and the first light exit surface 13. When a structure is employed in which vicinities of the long sides of the incident surface 12 and the first light exit surface 13 are held, the area of the aperture in the incident surface 12 in the vertical view angle direction is narrowed. In contrast, in the present embodiment, vicinities of the short sides of the incident surface 12 and of the first light exit surface 13 are held, utilizing the fact that the size of the beam splitter 5 in the horizontal view angle direction thereof is greater than the size of the beam splitter 5 in the vertical view angle direction thereof. As a result, the positional displacement before and behind the beam splitter 5 can be suppressed while maintaining a compact size of the side surface of the beam splitter 5. Moreover, by increasing the overlapping width W1 (FIG. 5) between the first light exit surface 13 and the peripheral wall portion as much as possible, it is possible to hold the beam splitter 5 more stably.

Figure 6:
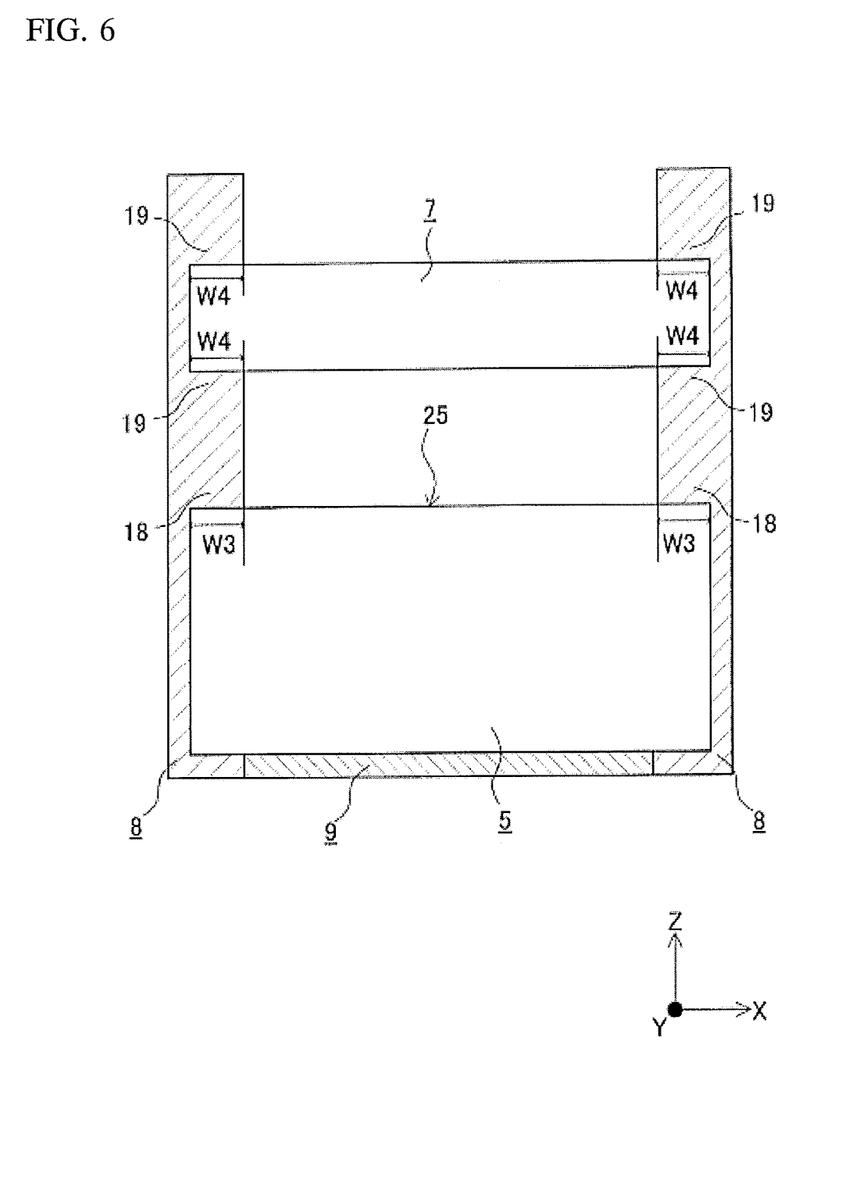
FIG. 6 is a cross-sectional view of the stereoscopic imaging device shown in FIG. 1, viewed along a VI-VI line.

Moreover, as shown in FIG. 6, the second light exit surface 25 and the peripheral wall portion 18 overlap each other in the X-axis direction by an overlapping width W3. The overlapping width W3 is designed to have a size that prevents the light bent by the optically functional surface 11 from being blocked by the peripheral wall portion 18. Specifically, the overlapping width W3 is designed to have the same size as the overlapping width W1 shown in FIG. 5. Moreover, the right-angled prism 7 and a peripheral wall portion 19 overlaps each other in the X-axis direction by an overlapping width W4, over the entire periphery of the right-angled prism 7. In the present embodiment, the overlapping width W4 is designed to have the same size as the overlapping width W3.

As described above, in the stereoscopic imaging device 1 according to the present embodiment, the beam splitter 5 and the right-angled prism 7 are supported by the holding members 8. In addition, since the end portions in the X-axis direction of the beam splitter 5 and of the right-angled prism 7 are fitted in the peripheral wall portions 18 and 19, it is possible to prevent the beam splitter 5 and the right-angled prism 7 from becoming loose in any of the X-, Y-, and Z-axis directions. Further, since the beam splitter 5 and the right-angled prism 7 are highly rigid, they do not deflect due to their own weights, either. Accordingly, distortion of the optical image and displacement in the direction of the optical path do not occur in the light split by the optical element holder 2. Therefore, it is possible to take a stereo image of a high accuracy. Moreover, in the stereoscopic imaging device 1, it is possible to shorten the length of the optical paths from the incident surface 12 to the incident surface of the cameras, by providing the beam splitter 5 and the right-angled prism 7 formed of materials having a refractive index greater than that of air. As a result, it is possible to reduce the size in the optical axis direction of the stereoscopic imaging device 1.

Second Embodiment

Figure 7:
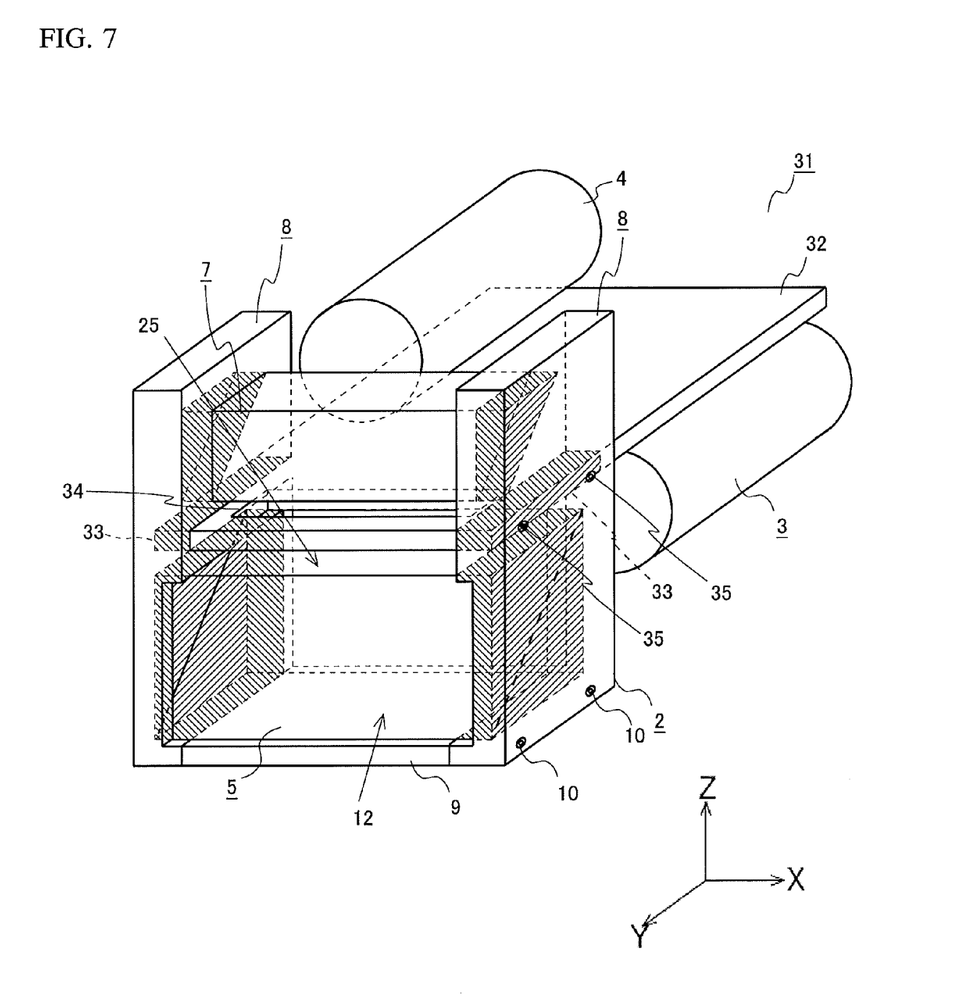
FIG. 7 is a perspective view of a stereoscopic imaging device according to a second embodiment of the present invention.
Figure 8:
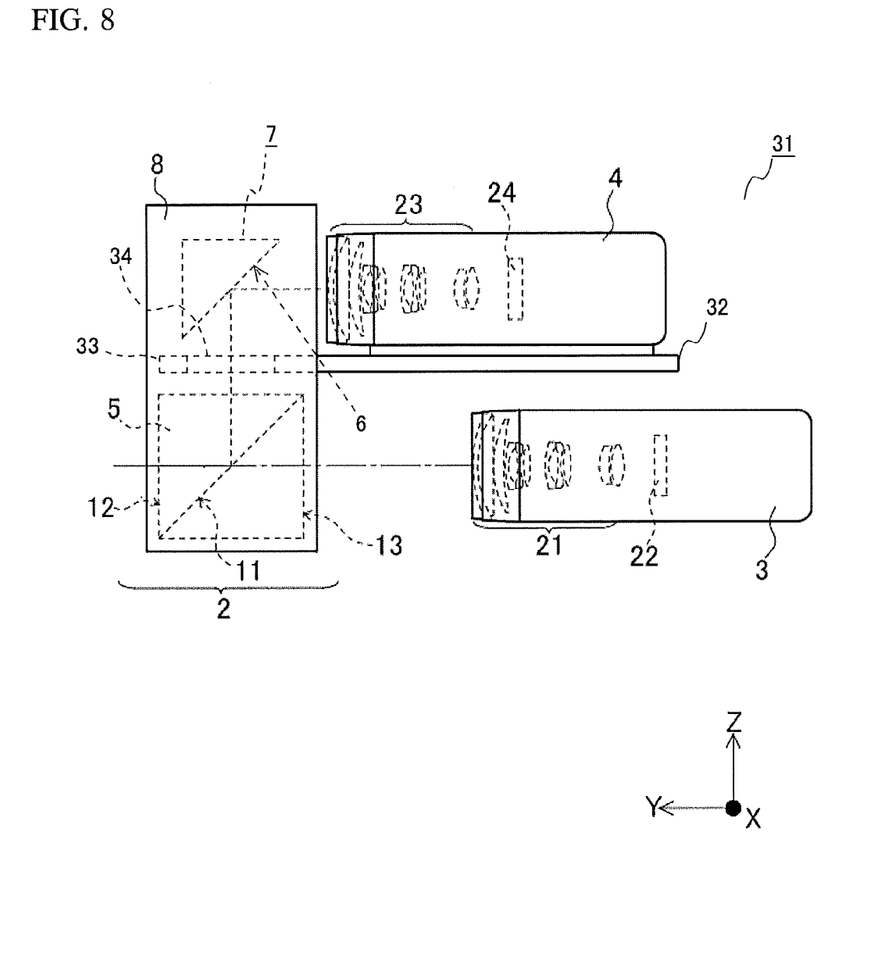
FIG. 8 is a side view of the stereoscopic imaging device shown in FIG. 7.

FIG. 7 is a perspective view of a stereoscopic imaging device according to a second embodiment of the present invention, and FIG. 8 is a side view of the stereoscopic imaging device shown in FIG. 7. Hereinafter, the difference between the present embodiment and the first embodiment will be mainly described.

First, the arrangement of the prism 7 of the present embodiment is different from that in the first embodiment. Specifically, the prism 7 is arranged above the beam splitter 5 such that the reflecting surface 6 is parallel to the optically functional surface 11 of the beam splitter 5. Accordingly, the light bent in the X-axis direction by the optically functional surface 11 of the beam splitter 5 is reflected by the reflecting surface 6 without passing through the inside of the right-angled prism 7, to be led to the second camera 4. In the first embodiment, if the distance between the beam splitter 5 and the first camera 3 and the distance between the right-angled prism 7 and the second camera 4 is reduced in order to downsize the stereoscopic imaging device, the positional relationship at which the second camera 4 contacts the light exit surface 15 of the right-angled prism 7 may pose a limitation. In contrast, in the second embodiment, since the reflecting surface 6 faces the second camera 4, the above limitation is alleviated, which may allow overall downsizing of the stereoscopic imaging device compared with that according to the first embodiment.

Next, the stereoscopic imaging device 31 according to the present embodiment further includes a flat plate 32 for mounting the second camera 4 thereon. The flat plate 32 is supported by the holding members 8 forming the optical element holder 2. Each of the holding members 8 further includes a groove 33 extending in the Y-axis direction, between a recess in which the beam splitter 5 is to be fitted and a recess in which the right-angled prism is to be fitted. As shown in FIG. 7, the flat plate 32 is mounted on the holding members 8 by portions of side surfaces of the flat plate 32 being fitted in the grooves 33, respectively. Each groove 33 is formed so as to be able to hold the top surface of the flat plate 32 in parallel to the second light exit surface 25 of the beam splitter 5. By employing this fitting structure, it is possible to reliably fix the flat plate 32 on the holding members 8 and to accurately position the top surface of the flat plate 32. It should be noted that the flat plate 32 is provided with a window 34 that allows the light from the beam splitter 5 to advance to the right-angled prism 7 without being blocked.

As shown in FIG. 7, the flat plate 32 is screwed to the holding members 8 with screws 35. The flat plate 32 screwed to the holding members 8 exhibits the same function as that of the combination of the base member 9 and the screws 10, and contributes to reliable holding of the beam splitter 5 and the right-angled prism 7 without damaging the optically functional surface 11 of the beam splitter 5.

Third Embodiment

Figure 9:
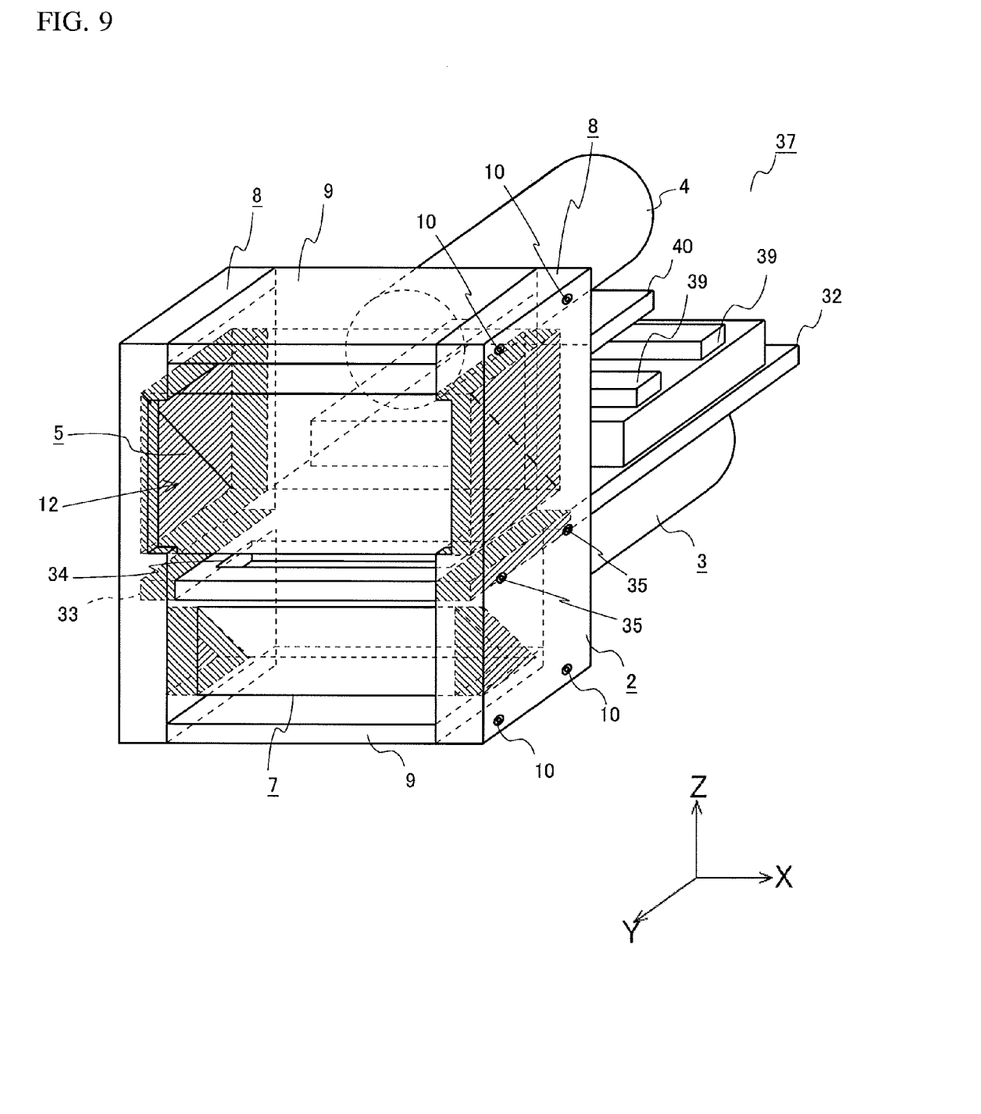
FIG. 9 is a perspective view of a stereoscopic imaging device according to a third embodiment of the present invention.
Figure 10:
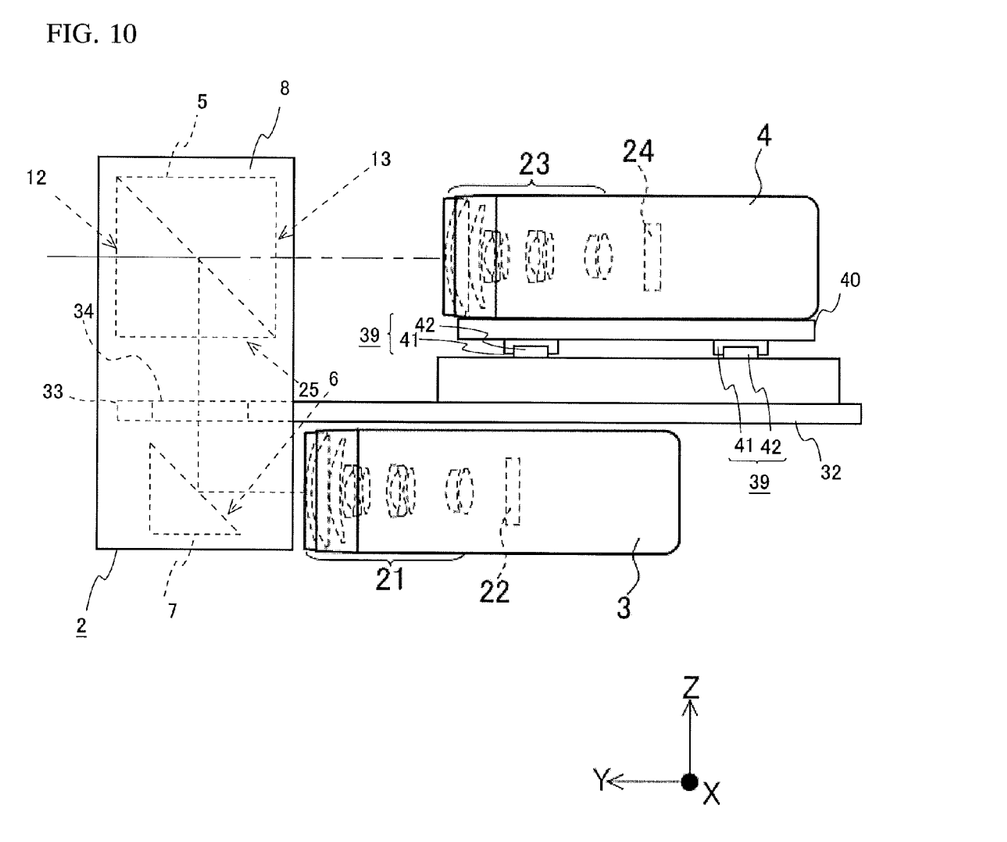
FIG. 10 is a side view of the stereoscopic imaging device shown in FIG. 9.

FIG. 9 is a perspective view of a stereoscopic imaging device according to a third embodiment of the present invention, and FIG. 10 is a side view of the stereoscopic imaging device shown in FIG. 9. Hereinafter, the difference between the present embodiment and the second embodiment will be mainly described.

First, in the present embodiment, the positions of the beam splitter 5 and the right-angled prism 7 are reversed from those in the first embodiment. That is, the beam splitter 5 is arranged in front of the second camera 4, and the right-angled prism 7 is arranged in front of the first camera 3. A part of the light having entered the incident surface 12 of the beam splitter 5 passes through the optically functional surface 11, exits the light exit surface 13, and then enters the second camera 4. The other part of the light having entered the incident surface 12 of the beam splitter 5 is reflected in the Z-axis negative direction by the optically functional surface 11, passes through the window 34 in the flat plate 32, is reflected in the Y-axis negative direction by the reflecting surface 6 of the right-angled prism 7, and then enters the first camera 3.

In a stereoscopic imaging device 37 according to the present embodiment, the second camera 4 for taking an image for a right eye is movable in parallel to the longitudinal direction (X-axis direction) of the beam splitter 5. The stereoscopic imaging device 37 is further provided with a mechanism for the parallel movement of the second camera 4. Specifically, the stereoscopic imaging device 37 further includes a stage 38 mounted on the top surface of the flat plate 32, sliders 39 mounted on the stage 38, and a mounting plate 40 which is mounted on the sliders 39 and on which the second camera 4 is mounted. Each of the sliders 39 includes a rail 41 laid on the stage 38, and a slide member 42 which engages the rail 41 and is slidable in the X-axis direction along the rail 41.

As described in the second embodiment, the flat plate 32 is fixed on the holding members 8 such that the top surface of the flat plate 32 is parallel to the second light exit surface 25 of the beam splitter 5, by the flat plate 32 being fitted in the grooves 33 of the holding members 8. The top surface of the flat plate 32 serves as a reference plane for mounting the stage 38 and the sliders 39. The exact arrangement of the top surface of the flat plate 32 is determined based on the surfaces of the beam splitter 5 by the holding members 8. Therefore, it is possible to ensure the accuracy of the parallel movement of the second camera 4 via the sliders 39.

It should be noted that although the optical element holder 2 according to the first to third embodiments includes the right-angled prism 7, the right-angled prism 7 may not be used. For example, without using the right-angled prism 7, the second camera 4 may be arranged in a state where the second camera 4 faces the second light exit surface 25 and the optical axis of the optical system 23 coincides with the vertical direction (Z-axis direction).

The holding member according to the first to third embodiments holds the beam splitter 5 and the right-angled prism 7 integrally. However, the holding member may hold only the beam splitter 5 and another hold mechanism may hold the right-angled prism 7.

Moreover, in the first to third embodiments, the first camera 3 takes an image for a left eye and the second camera 4 takes an image for a right eye. However, the left-right positional relationship between the first camera 3 and the second camera 4 may be reversed.

Moreover, in the first to third embodiments, the right-angled prism 7 is used to lead the light bent by the beam splitter 5 to the second camera 4. However, instead of the right-angled prism 7, a mirror may be used. Also in the case where a mirror is used instead of the right-angled prism 7, the pair of the holding members 8 may be provided with recesses, such that opposing side portions of the mirror are fitted and held in the recesses.

Alternatively, when a mirror is used, there may be prepared the right-angled prism 7 having the reflecting surface 6 implemented as a mirror (reflective film), and each side of the right-angled prism 7 may be structured by a rigid support member. In this case, it is preferable that the shape of the side surface of the prism including the mirror is a right-angled isosceles triangle.

Moreover, as described in the first to third embodiments, the beam splitter 5 may be arranged above or below the right-angled prism 7. The arrangement of the beam splitter 5 and the right-angled prism 7 shown as a specific example in each embodiment may be reversed. Any arrangement of the reflecting surface 6 of the right-angled prism 7 may also be employed. Therefore, in the second and third embodiments, the right-angled prism 7 may be arranged as in the first embodiment. On the contrary, in the first embodiment, the right-angled prism 7 may be arranged as in the second and third embodiments.

Moreover, also in the first embodiment, as in the second and third embodiments, the holding members 8 may further include the grooves 33 and the flat plate 32 which is fitted in the grooves 33. On the contrary, the grooves 33 and the flat plate 32 may be omitted from the components according to the second and third embodiments.

Moreover, in the third embodiment, although the sliding mechanism has been described that moves the second camera 4 in parallel to the longitudinal direction of the beam splitter 5, the mechanism is not limited thereto and a sliding mechanism having another configuration may be employed. Such a sliding mechanism may include a feeding mechanism using a combination of ball screws or feed screws and a motor.

Moreover, the sliding mechanism described in the third embodiment may be added to the first and second embodiments.

The present invention may be used, for example, in a stereoscopic imaging device that takes a stereoscopic image.

Details of the present invention have been described above. However, the above-mentioned description is completely illustrative from every point of view, and does not limit the scope of the present invention. Obviously, various improvements and modifications can be performed without departing from the scope of the present invention.

What is claimed is:

1. An optical element holder utilized in order to take stereo images with two cameras, the optical element holder comprising:

a rectangular parallelepiped beam splitter having a rectangular incident surface and a facing surface opposing the rectangular incident surface;

a pair of holding members arranged facing each other and configured to retain the beam splitter with either of lengthwise end portions of the beam splitter fitted into the pair of holding members; and a pressing member configured to press on the pair of holding members to draw them toward each other; wherein the holding members each have a flat-surface portion covering a lateral surface of the beam splitter, and a peripheral wall portion standing peripherally along the flat-surface portion, and a width, along the beam splitter lengthwise, whereby its facing surface and each holder peripheral wall portion overlap is greater than a width, in the same direction, whereby the beam-splitter incident surface and each holder peripheral wall portion overlap.

2. The optical element holder according to claim 1, further comprising:

a right-angled prism configured to reflect at least part of light bent by the beam splitter, the right-angled prism retained by being fitted into each of the pair of holding members.

3. The optical element holder according to claim 2, wherein each of the pair of holding members further includes a groove for snugly receiving a flat plate so that the plate parallels a plane orthogonal to the incident surface of the beam splitter.

4. A stereoscopic imaging device comprising:

the optical element holder according to claim 2, a first camera arranged such that its optical-system optical axis is orthogonal to the beam-splitter incident surface, for photographing optical images passing through an optically functional surface of the beam splitter; and a second camera arranged such that its optical-system optical axis parallels the optical-system optical axis of the first camera, for photographing optical images reflected by the right-angled prism; wherein either the first camera or the second camera is supported so that the camera may be shifted lengthwise with respect to the beam splitter.

5. An optical element holder utilized in order to take stereo images with two cameras, the optical element holder comprising:

a rectangular parallelepiped beam splitter having a rectangular incident surface and a facing surface opposing the rectangular incident surface;

a pair of holding members arranged facing each other and configured to retain the beam splitter with either of lengthwise end portions of the beam splitter fitted into the pair of holding members; and a pressing member configured to press on the pair of holding members to draw them toward each other; wherein the holding members each have a flat-surface portion covering a lateral surface of the beam splitter, and a peripheral wall portion standing peripherally along the flat-surface portion, and a width, along the beam splitter lengthwise, whereby its facing surface and each holder peripheral wall portion overlap and a width, in the same direction, whereby the beam-splitter incident surface and each holder peripheral wall portion overlap are determined in accordance with an angle of view of the optical system of a camera photographing optical images passing through the facing surface.

6. The optical element holder according to claim 5, further comprising:

a right-angled prism configured to reflect at least part of light bent by the beam splitter, the right-angled prism retained by being fitted into each of the pair of holding members.

7. A stereoscopic imaging device comprising:

the optical element holder according to claim 6;

a first camera arranged such that its optical-system optical axis is orthogonal to the beam-splitter incident surface, for photographing optical images passing through an optically functional surface of the beam splitter; and a second camera arranged such that its optical-system optical axis parallels the optical-system optical axis of the first camera, for photographing optical images reflected by the right-angled prism; wherein either the first camera or the second camera is supported so that the camera may be shifted lengthwise with respect to the beam splitter.

* * * * *

UNITED STATES PATENT AND TRADEMARK OFFICE
CERTIFICATE OF CORRECTION

| | | |
|---|---|---|
| PATENT NO. | : 8,457,485 B2 | Page 1 of 1 |
| APPLICATION NO. | : 13/338274 | |
| DATED | : June 4, 2013 | |
| INVENTOR(S) | : Takashi Masuno et al. | |

It is certified that error appears in the above-identified patent and that said Letters Patent is hereby corrected as shown below:

Title page, at item (30) under the heading Foreign Application Priority Data,

"Dec. 28, 2010         (JP) ................................ 2010-294049"

should read:

--Dec. 28, 2010         (JP) ................................ 2010-294049
  Nov. 25, 2011         (JP) ................................ 2011-257980--.

Signed and Sealed this
First Day of October, 2013

Teresa Stanek Rea
*Deputy Director of the United States Patent and Trademark Office*